United States Patent
Myeong

[19]

[11] Patent Number: 5,844,604
[45] Date of Patent: Dec. 1, 1998

[54] CAMCORDER HAVING SEPARABLE CAMERA UNIT AND RECORDER UNIT

[75] Inventor: Joo-Hwan Myeong, Kyungki-Do, Rep. of Korea

[73] Assignee: LG Electronics, Inc., Seoul, Rep. of Korea

[21] Appl. No.: 575,169

[22] Filed: Dec. 19, 1995

[30] Foreign Application Priority Data

Dec. 19, 1994 [KR] Rep. of Korea .................. 1994 35096

[51] Int. Cl.⁶ ................................................. H04N 5/225
[52] U.S. Cl. ........................................... 348/373; 348/376
[58] Field of Search .................................... 348/373, 374, 348/375, 376, 333; 386/118; 358/906; 220/346

[56] References Cited

U.S. PATENT DOCUMENTS

| 4,499,504 | 2/1985 | Edakubo et al. ..................... 386/118 |
|---|---|---|
| 4,547,815 | 10/1985 | Kimura ................................... 386/118 |
| 4,716,474 | 12/1987 | Kiuchi ..................................... 386/118 |
| 4,746,990 | 5/1988 | Katoh et al. ........................... 358/906 |
| 4,953,030 | 8/1990 | Seo ......................................... 348/375 |
| 5,157,512 | 10/1992 | Inada et al. ............................ 348/373 |
| 5,170,262 | 12/1992 | Kinoshita et al. ..................... 386/118 |
| 5,306,174 | 4/1994 | Kiga . |
| 5,381,179 | 1/1995 | Kashimura . |

*Primary Examiner*—Wendy Garber

[57] ABSTRACT

A camcorder including separate, but engageable, camera and recorder units is provided with a locking mechanism for locking together the camera and recorder units when engaged. The locking mechanism consists of a first locking portion which locks together the camera and recorder units during the process of engaging them together, and a second, manually actuated locking portion which is manually operated after the recorder and camera units are engaged.

15 Claims, 13 Drawing Sheets

CAMCORDER HAVING SEPARABLE CAMERA UNIT AND RECORDER UNIT

BACKGROUND OF THE INVENTION

1. Field of the Invention

The present invention relates to a camcorder having a separable camera unit and recorder unit, and in particular to a camcorder having a separable camera unit and recorder unit that are more accurately combinable and more easily separable.

2. Description of the Conventional Art

FIG. 1 shows a conventional camcorder having a separable camera unit and recorder unit. As shown therein, a recorder unit 91 and a camera unit 92 are engaged with each other by a hook 94 which is operated by button 93. Here, the hook 94 is relatively weak against force applied thereto, and since the engagement between the camera unit and the recorder unit is not stable, the hook 94 can be easily deflected. Therefore, when moving the camcorder, the separable camera and recorder units can be easily separated and broken.

FIG. 2 shows a separated camera unit and recorder unit of another conventional camcorder. As shown therein, camera unit 98 includes a zoom lens 95, a microphone 96, an antenna 97, and a cable 101. Recorder unit 100 includes a control panel 99. Here, the camera unit 98 and the recorder unit 100 are connected by cable 101. This embodiment has disadvantages in that it is very inconvenient to move and use the camcorder because the camera unit 98 and the recorder unit 100 are connected by the cable 101.

In addition, FIG. 3 shows a separated camera unit 102, viewfinder 104, and recorder unit 103 of another conventional camcorder. Here, the camera unit 102 and the viewfinder 104 are connected by a second lead cable 107, and the camera unit 102 and the recorder unit 103 are connected by a first lead cable 106. In addition, a controller 105 is connected to a predetermined portion of the first lead cable 106. However, this embodiment has a disadvantage in that connection portions of each lead cable can be tangled and easily broken from force applied thereto. In addition, when using the system, a user needs to support the camcorder unit with one hand.

SUMMARY OF THE INVENTION

Accordingly, it is an object of the present invention to provide a camcorder having a separable camera unit and recorder unit, which overcomes the problems encountered in a conventional camcorder having a separable camera unit and recorder unit.

It is another object of the present invention to provide a camcorder having a separable camera unit and recorder unit which can be more accurately combined and more easily separated.

To achieve the above objects, a camcorder having a separable camera unit and recorder unit is provided. The camcorder includes a recorder unit receiving a magnetic cassette tape therein for recording and reproducing audio and video signals, and a camera unit having a view finder for viewing an image to be recorded. A locking member is provided for locking/unlocking the recorder unit and the camera unit. A signal receiving/transmitting unit for receiving/transmitting signals is provided for when the recorder unit and the camera unit is engaged.

DETAILED DESCRIPTION OF THE INVENTION

Figure 1:
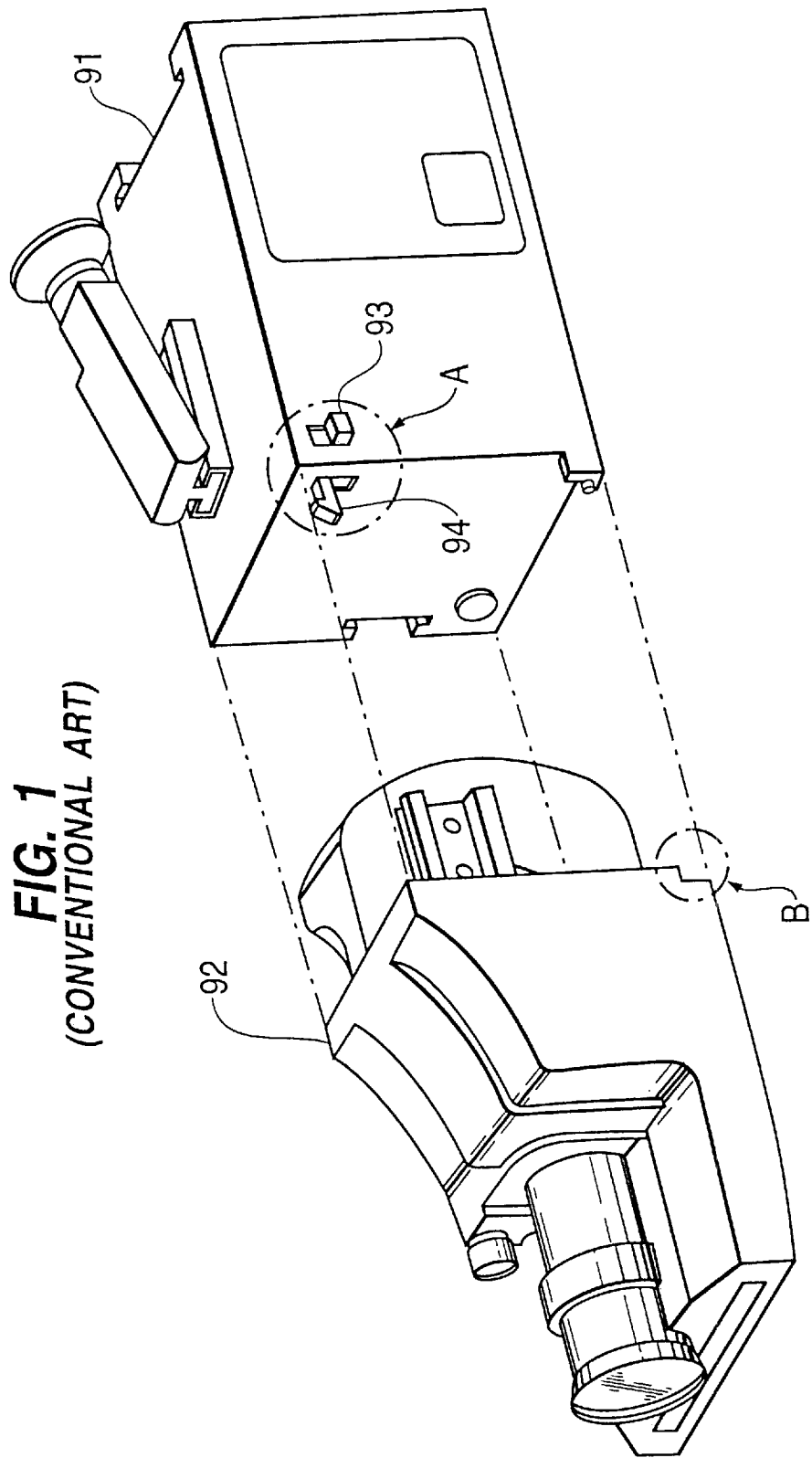
FIG. 1 is a perspective view of a separated camera unit and recorder unit of a conventional camcorder.
Figure 2:
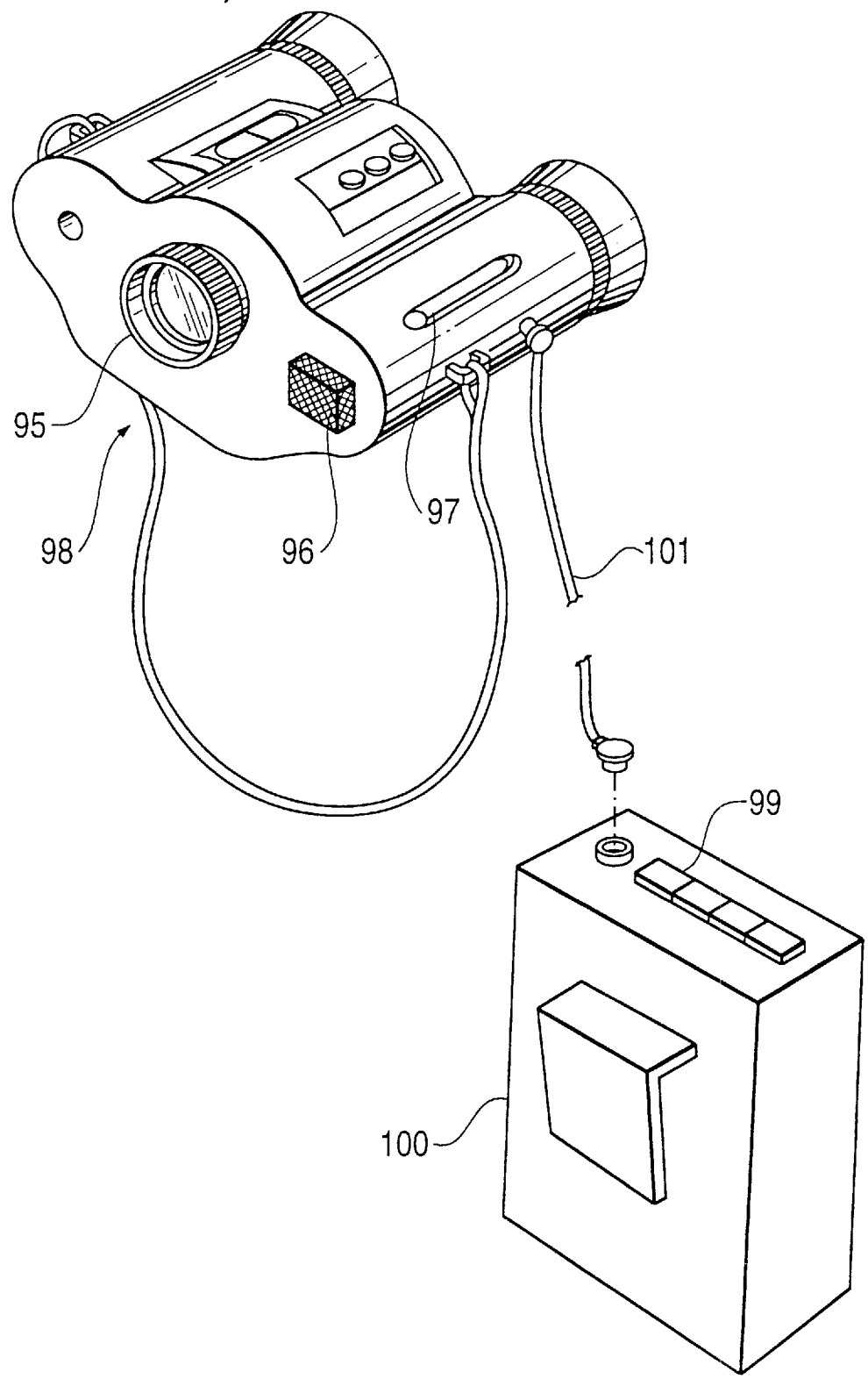
FIG. 2 is a perspective view of a separated camera unit and recorder unit of another conventional camcorder.
Figure 3:
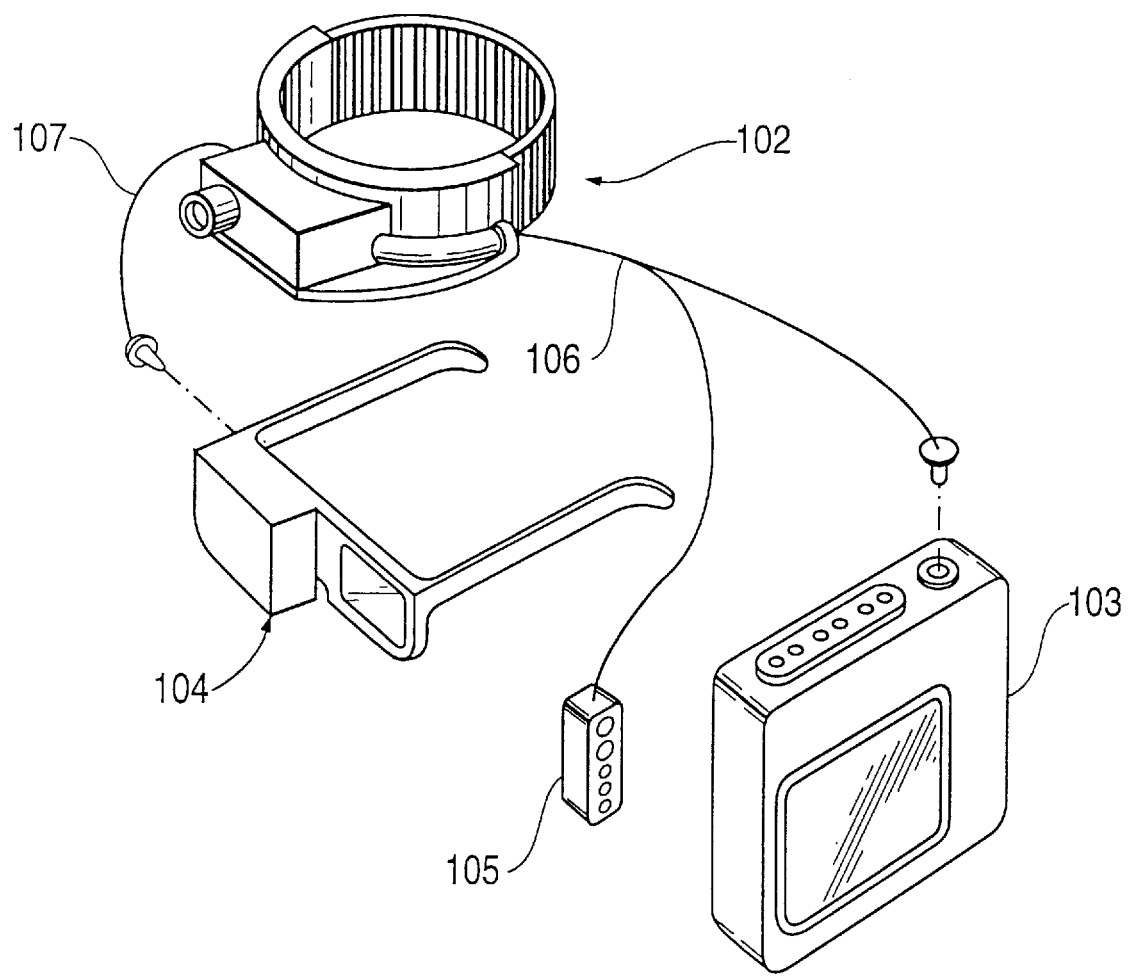
FIG. 3 is a perspective view of a separated camera unit, viewfinder, and a recorder unit of yet another conventional camcorder.

As shown in FIGS. 4 through 6 and 8 through 10, a camcorder having a separable camera unit and recorder unit according to the present invention includes a recorder unit 11 and a camera unit 12, a battery 13 mounted on a predetermined portion of the recorder unit 11 for supplying power thereto, and insertion portion 14 formed on one side of the recorder unit 11 for supplying power thereto, an insertion portion 14 formed on one side of the recorder unit 11 for receiving a predetermined engaging portion of the camera unit 12, an insertion groove 15 and a guide rib 16 formed at upper and lower portions of the insertion portion 14, a protruded engaging section 17 slidable within the insertion portion 14 and being engagable with respect to the guide rib 16 and having protrusions 18 and grooves 19 formed at the upper edge and the lower edge thereof, respectively. A locking groove 20 is formed on one side of the insertion portion 14, with an engaging protrusion 22 defining an engaging groove 21 and a slanted surface 22a formed at a lower portion of the locking groove 20. A connector 23 having a plurality of guide protrusions and pins is provided at the other side of the insertion portion 14. A cable 27 has sockets 25 and 26 at respective ends thereof, which are connected to jacks and 31, respectively. A hole 28 passes through a portion of the groove 19 of the camera unit 12. A view finder 30 is disposed at a rear portion of the camera unit 12 for viewing an object to be recorded. A plurality of protruded hooks 32, 33, 34, and 35 having engaging protrusions 32a, 33a, 34a, and 35a are formed on the inner wall of a left side casing 12a of the camera unit 12. Guide holes 36 and 37a formed adjacent to the zoom lens 29 on the inner wall of the left side casing 12a. A pass-through hole 38 extend above and below, respectively, the guide holes 36 and 37. Bosses 39 and 40 extend above and below, respectively, the guide holes 36 and 37. Boss 43 is formed on one side of the upper guide hole 36. A torsion spring 41 is mounted on boss 43 and is fixed by a bolt 42. An engaging protrusion 44 is disposed at the other side of the guide hole 36 for supporting the upper portion of the torsion spring 41. A hole 46 is formed on one side of the left side casing 12a adjacent to the viewfinder 30 for receiving a circuit substrate 45. Bosses 49 and 50 are formed above and below the hole 46 for fixing the circuit substrate 45 by bolts 47 and 48. A guide opening 45a and pin holes 45b are formed in the circuit substrate 45 for receiving guide protrusion 23a and the pin 23b. A connection portion 51 is formed on the circuit substrate. A slide knob 56 cooperates with the guide grooves 52 and 53 formed at the inner lower portion of the left side casing 12a and is integral with a rack gear 54. An upper lever 58 has one end engaged to the boss 39, an elongated opening 58a formed at an intermediate portion for providing an elastic force to the upper level 58, and a pressuring protrusion 58b formed at an intermediate portion of the upper lever 58 and engaged to the groove 19. A lower lever 60 has one end engaged to the boss 40 by bolt 59, an elongated opening 60a formed at an intermediate portion of the lower lever 60 for providing an elastic force to the lower lever 60, and a pressuring protrusion 60b formed at an intermediate lower portion of the lower lever 60 for providing an elastic force to the lower lever 60. A spring 61 is elastically connected to the engaging portions 58c and 60c formed at the other end of the upper and lower levers 58 and 60. A gear 62 intermeshed with the rack gear 54 and has an engaging opening 62c including rectangular grooves 62a and 62b, so that gear 62 is elastically engaged to the central portion hooks 32, 33, 34, and 35 on the left side casing 12a. A cam 63 is formed on one side surface of the gear 62 about the engaging opening 62c. Eccentric cam surfaces 63a and 63b formed on both sides of the cam 63 drive the upper and lower levers 58 and 60 in accordance with the rotation of the gear 62. A locking pin 64 is selectively movable between the guide holes 36 and 37, and has an upper surface pressed by the lower portion of the torsion spring 41 when one end of the locking pin is engaged to the locking groove 20 of the recorder unit 11. A pressuring plate 65 is disposed at the bottom portion of the gear 62 for pushing the locking pin 64. Right side casing 12b is engaged to left side casing 12a and includes a support plate 66 for supporting the slide knob 56, and support plats 67 and 67a formed on the both sides of the support plate 66.

The operation of the camcorder according to the present invention will now be explained with reference to the accompanying drawings.

Figure 4:
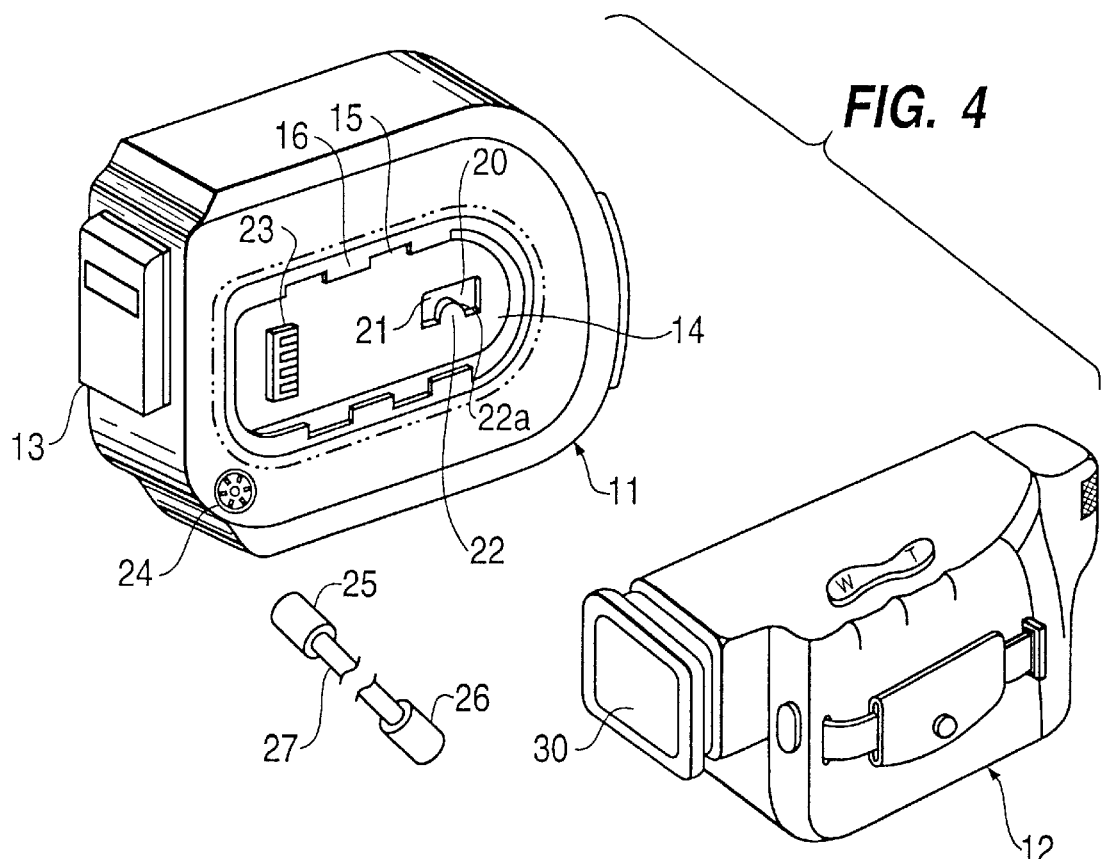
FIG. 4 is a perspective view of a separated camera unit and recorder unit of a camcorder according to the present invention.
Figure 5:
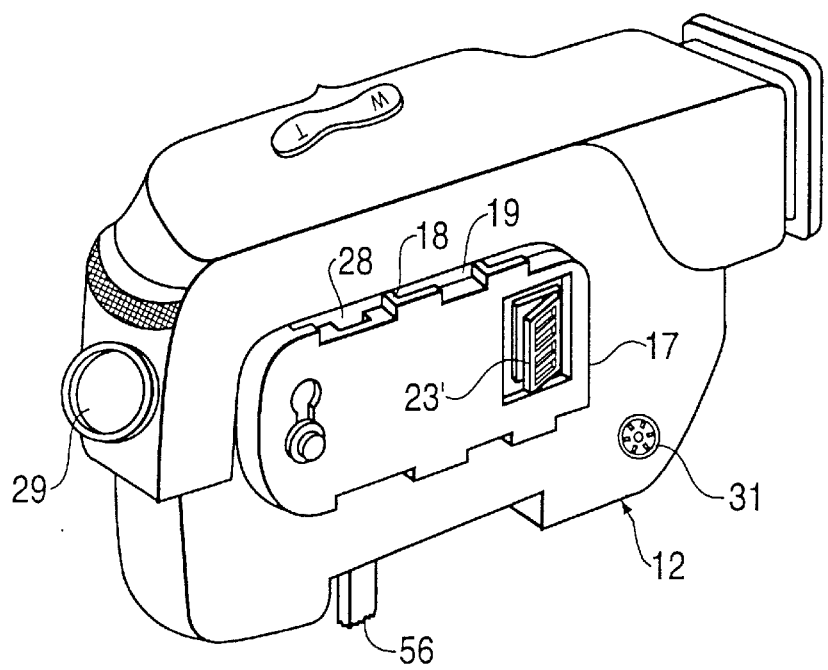
FIG. 5 is a perspective of a camera unit according to the present invention.
Figure 6:
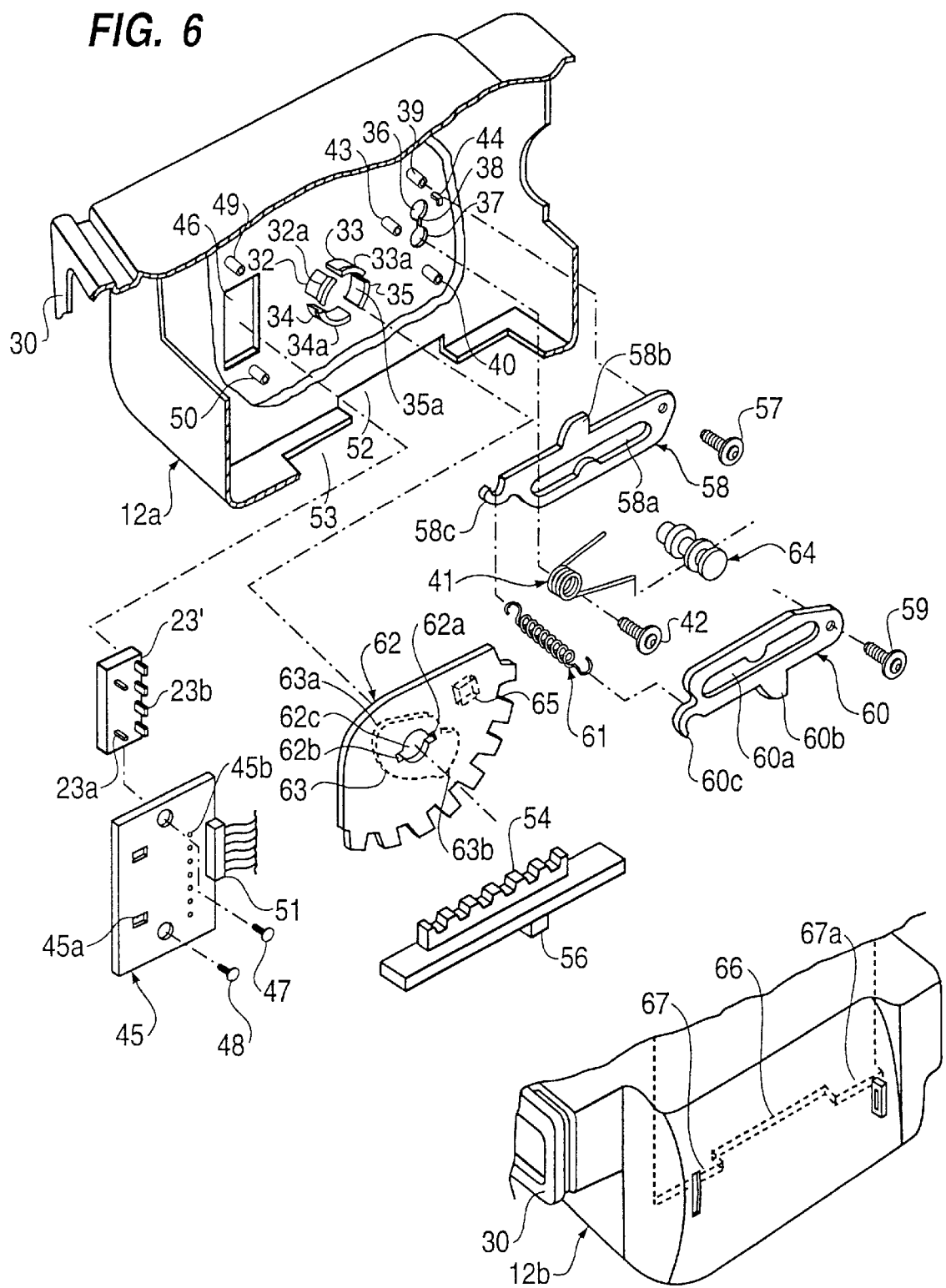
FIG. 6 is an exploded view of a camera unit of the camcorder according to the present invention.
Figure 7A:
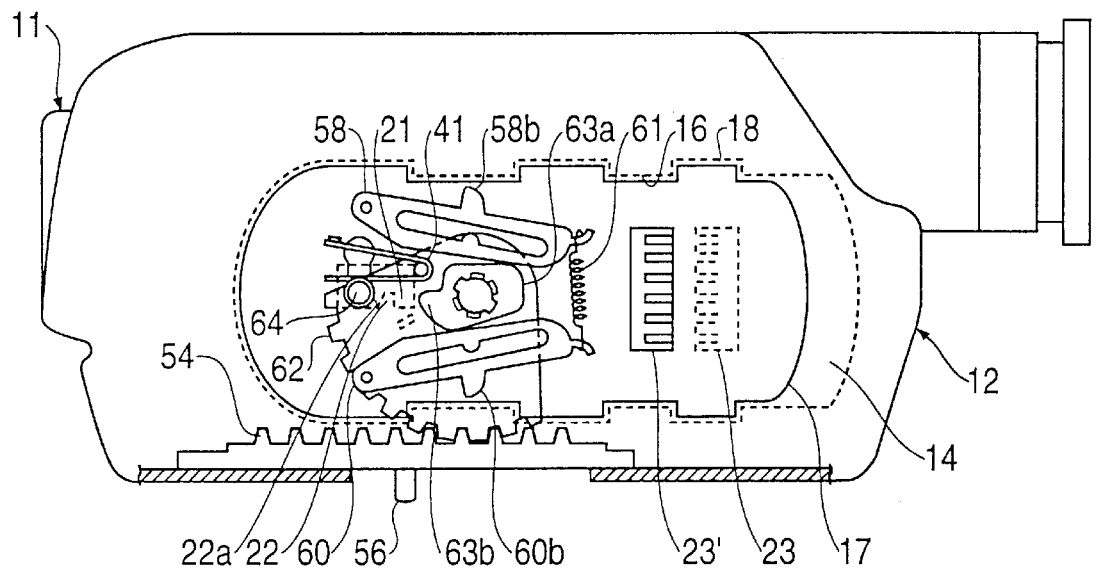
FIG. 7A is a side view showing a camcorder having a separable camera unit and recorder unit, before the separable camera unit and recorder unit are combined with each other according to the present invention.

To begin with, as shown in FIGS. 4 through 6, the recorder unit 11 and the camera unit 12 are placed in opposition. Here, a plurality of insertion grooves 15 of the recorder unit 11 oppose a plurality of protrusions 18 of the camera unit 12. Thereafter, when slightly pulling the camera unit 12 toward the viewfinder 30, the camera unit 12 slides with respect to the recorder unit 11 so that the recorder unit 11 and the camera unit 12 are locked. That is, in more detail, as shown in FIG. 7A, the locking pin 64 initially located in guide hole 37 moves with the camera unit 12, and elastically moves in cooperation with the torsion spring 41 along a path formed between the right side engaging protrusion 22 and the engaging groove 21 along the slanted surface 22a formed at the lower portion of the locking groove 20 of the recorder unit 11, so that a first locking operation between the recorder unit 11 and the camera unit 12 is executed.

Figure 7B:
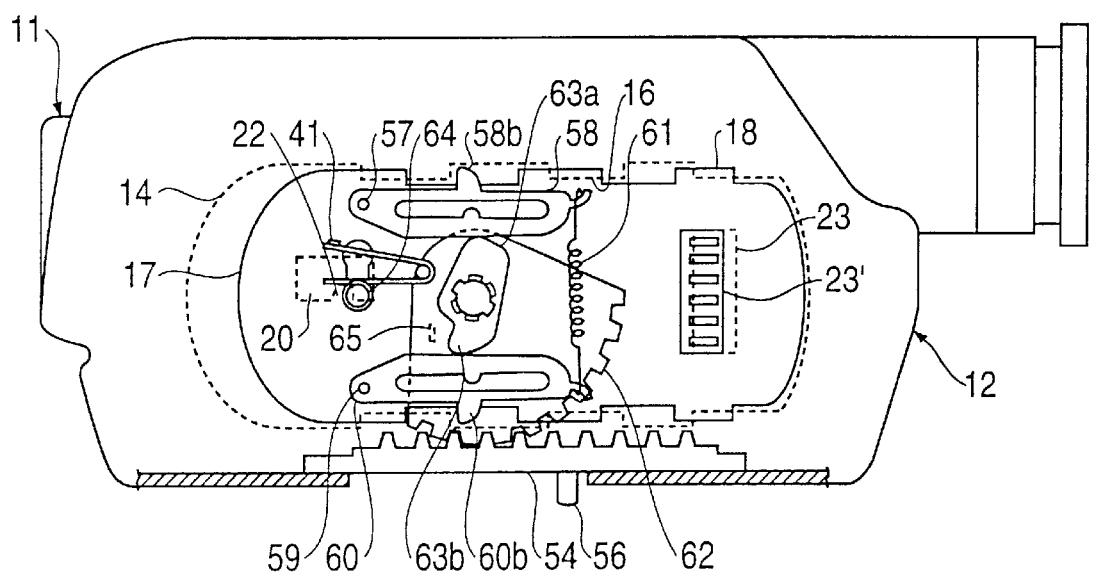
FIG. 7B is a side view showing a camcorder having a separable camera unit and recorder unit, after the separable camera unit and recorder unit are combined with each other according to the present invention.

Next, when pulling the slide knob 56 to the right side, that is, in the direction of the viewfinder 30, as shown in FIG. 7B, the rack gear 54 correspondingly moves to the right side together with the slide knob 56. The gear 62 and the cam 63 therefore move in the counterclockwise direction about the hooks 32, 33, 34 and 35. At this time, the upper and lower levers 58 and 60 contacting the eccentric cam surfaces 63a and 63b of the cam 63 move counterclockwise and clockwise, respectively, about the bolts 57 and 59 engaged to the bosses 39 and 40, according to the eccentricity of the eccentric cam surfaces 63a and 63b. The spring 61 is thereby extended. At this same time, the pressure protrusions 58b and 60b of the upper and lower levers 58 and 60 are projected into the upper and lower grooves 28 of the camera unit 12, respectively.

Therefore, the second locking operation between the recorder unit 11 and the camera unit 12 is executed.

In addition, in the course of locking together the recorder unit 11 and the camera unit 12, the electrical connectors 23 and 23' are connected.

Figure 7C:
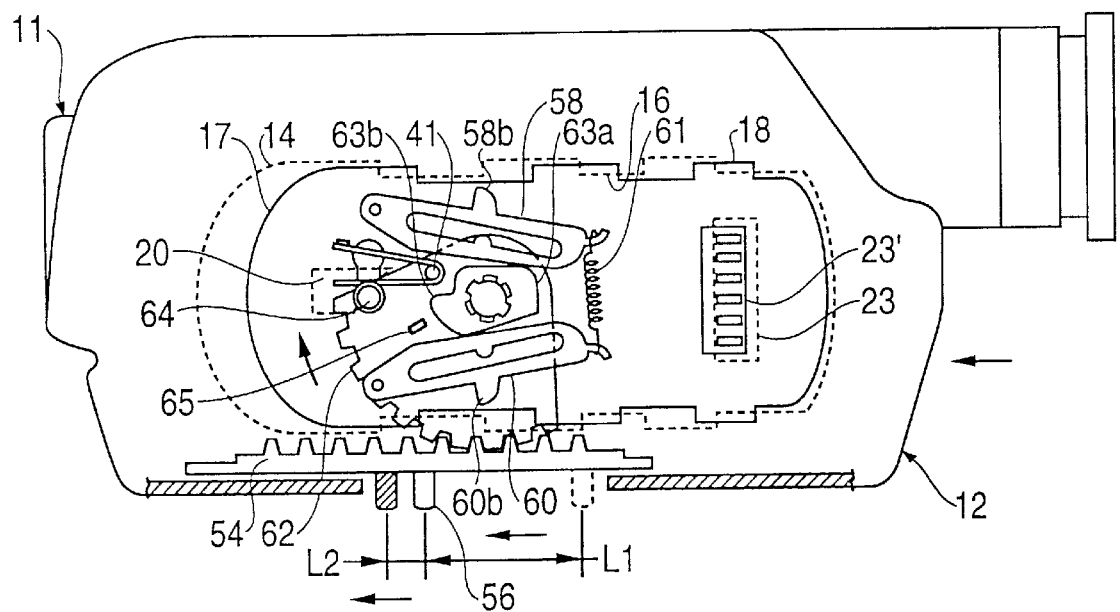
FIG. 7C is a side view showing a camcorder having a separable camera unit and recorder unit after the separable camera unit and recorder unit are combined with each other in accordance with first and second locking modes according to the present invention.
Figure 8:
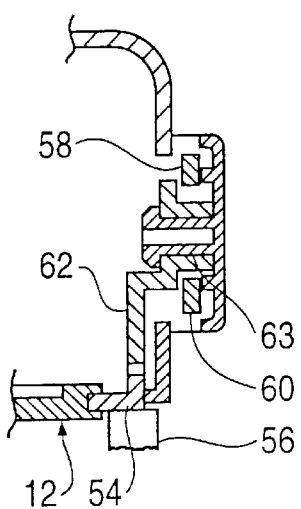
FIG. 8 is a cross-sectional view showing a locking portion between a camera unit and a recorder unit according to the present invention.
Figure 9:
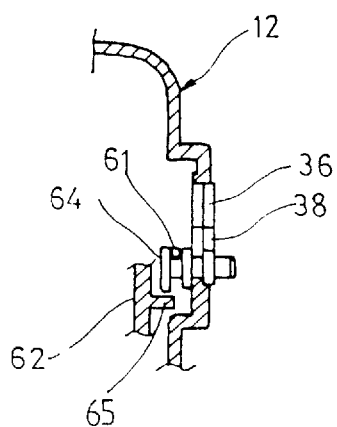
FIG. 9 is a cross-sectional view showing a first locking portion between a camera unit and a recorder unit according to the present invention.
Figure 10:
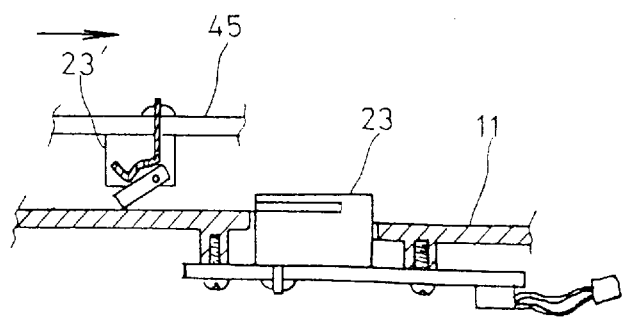
FIG. 10 is a cross-sectional view showing a second locking portion between a camera unit and a recorder unit.
Figure 11:
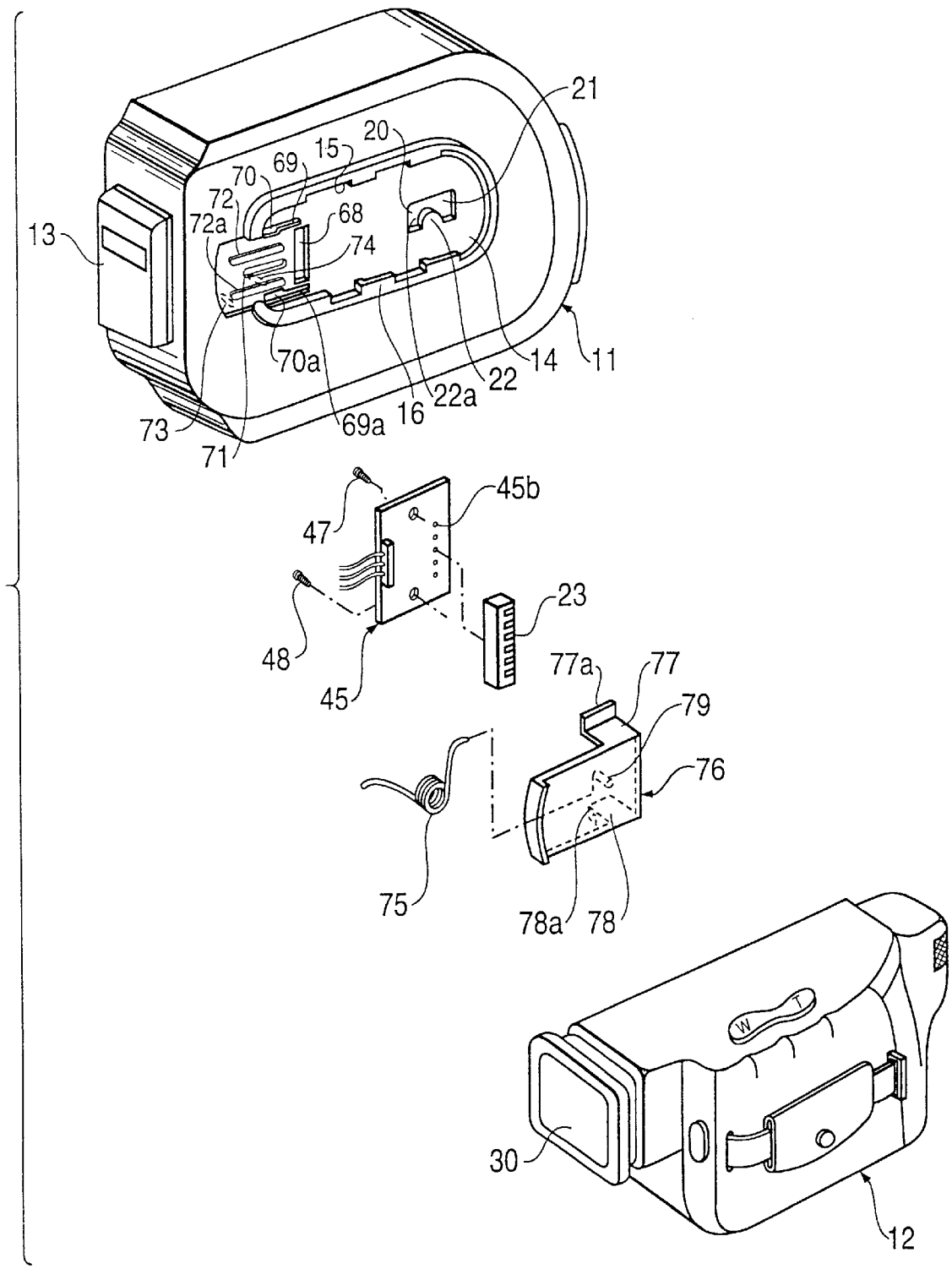
FIG. 11 is an exploded view showing a camcorder having a separable camera unit and recorder unit according to another embodiment of the present invention.
Figure 12:
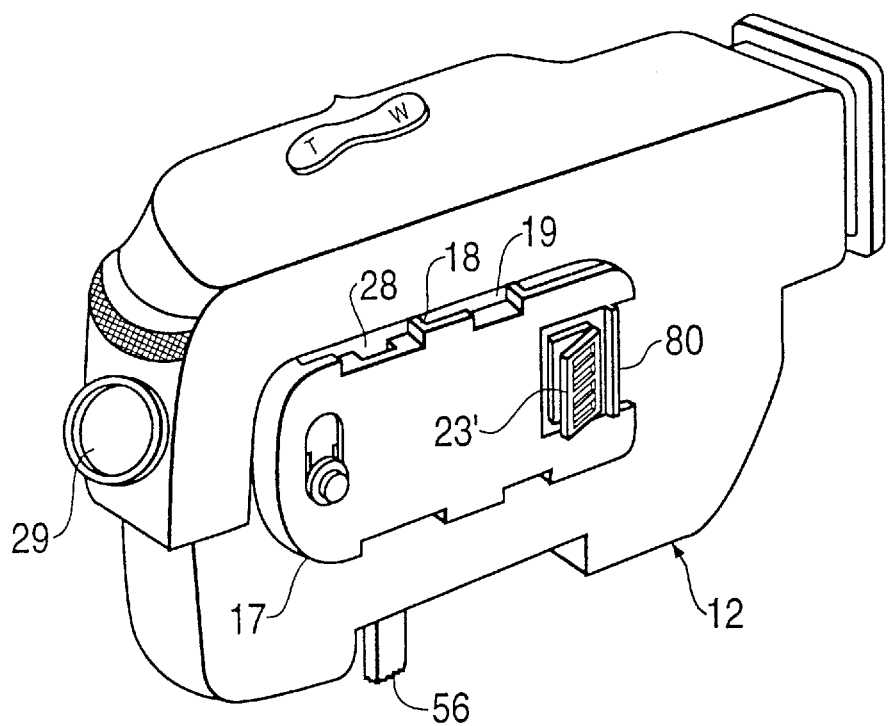
FIG. 12 is a perspective view showing the camera unit of the camcorder of FIG. 11 according to the present invention.

Meanwhile, when separating the recorder unit 11 and the camera unit 12, as shown in FIG. 7C, the slide knob 56 is moved to the left side by as much as the first locking releasing distance L1. Accordingly, the gear 62, intermeshed with the rack gear 54, rotates in the clockwise direction so that the eccentric cam surfaces 63a and 63b of the cam 63 return to their original positions. The upper and lower levers 58 and 60 contacting the eccentric cam surface 63a and 63b therefore rotate clockwise and counterclockwise, respectively, and the pressure protrusions 58b and 60b are retracted from the grooves 28 of the camera unit 12. Thus, the first releasing operation is completed.

In addition, in the above-described state, when the slide knob 56 is further moved to the left side by as much as the second locking releasing distance L2, the gear 62 further rotates in the clockwise direction, so that the pressure plate 65 located on gear 62 pushes the locking pin 64 upwardly. At this time, the locking pin 64 presses against the action the torsion spring 41, and is disengaged from the engaging protrusion 22 of the locking groove 20. Locking pin 64 therefore moves along the slanted surface 22 and the torsion spring 41 is released. The second unlocking operation is therefore completed. Therefore, all of the locking members are separated from one another, and the recorder unit 11 and the camera unit 12 can be separated.

Next, the operation connectors 23 and 23' according to the present invention will now be explained with reference to the accompanying drawings.

To begin with, when the camera unit 12 is moved to the right side direction in order to lock the recorder unit 11 and the camera unit 12, the circuit substrate 45 fixed to the camera unit 12 also moves. In addition, the connector 23' (connected to the terminal of the circuit substrate 45) is connected with the connector 23 of the circuit substrate 45 fixed to the recorder unit 11. The connection of the connector 23' and 23 is performed when the first and second locking operations for engaging the recorder unit 11 and the camera unit 12 are completed.

Meanwhile, FIGS. 11 through 15 show a camcorder having a separable camera unit 12 and recorder unit 11 according to a second embodiment of the present invention, which is directed to preventing parts breakage caused by shorting between parts, or erroneous operation when moving the camcorder, or when separating or connecting the camcorder. The camcorder includes an elongated opening 68 formed on one side of the insertion section 14 of the recorder unit 11, connection opening 69 and 69a and engaging opening 70 and 70a formed at a periphery of the elongated opening 68. An elongated opening 71 and guide ribs 72 and 72a are formed at the intermediate, upper, and lower portions between the connection openings 69 and 69a. Support protrusions 73 and 74 are formed on the lower side of the elongated opening 71. A torsion spring 75 for receiving the support protrusions 74 has one end thereof engaged with the support protrusion 79 and the other end thereof engaged with the protrusion 73. A connector 23 connected with the circuit substrate 45 is fixed to the rear side surface of the insertion section 14 by bolts 47 and 48 and the pin holes 45b of the circuit substrate 45. Connector 23 is inserted into the elongated opening 68 inside the insertion section 14. A cover 76 is elastically supported in the connection openings 69 and 69a and the engaging openings 70 and 70a by elastic ribs 77 and 78 having engaging hooks 77a and 78a. A support protrusion 79 protrudes from one side surface of the cover 76 and is inserted into the elongated opening 71. Support protrusion 79 also receives the end of the torsion spring 75. A pressure protrusion 80 is formed at an edge of the connector 23' engaged to one side of the engaging section 17 of the camera unit 12.

Figure 13A:
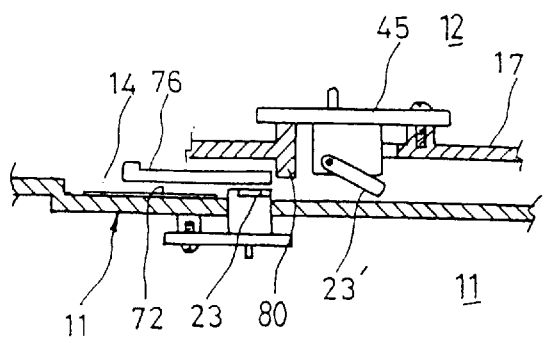
FIG. 13A is a cross-sectional view of a connector before a camera unit and a recorder unit are combined according to the present invention.
Figure 13B:
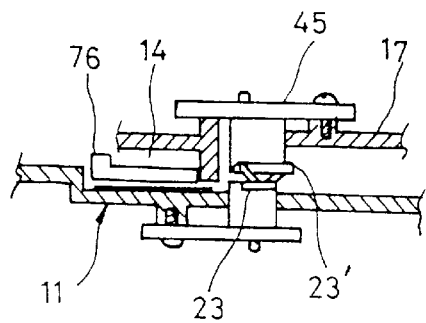
FIG. 13B is a cross-sectional view of a connector after a camera unit and a recorder unit are combined according to the present invention.
Figure 14A:
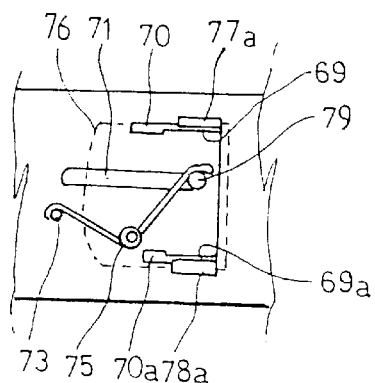
FIGS. 14A and 14B are side views of FIGS. 13A and 13B, respectively, according to the present invention.
Figure 14B:
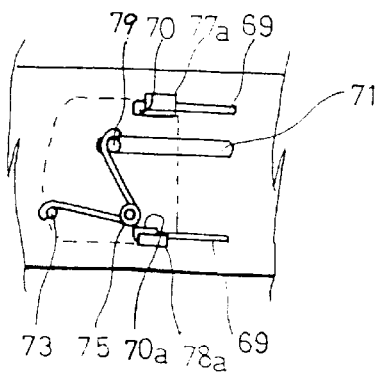
Figure 15:
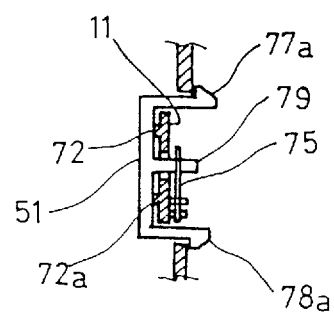
FIG. 15 is a cross-sectional view of FIG. 13.

Therefore, as shown in FIGS. 13A and 14A, when the recorder unit 11 and the camera unit 12 are engaged, the camera unit 12 is pushed to the left side direction so that the pressure protrusion 80 of the camera unit 12 pushes the right end of the cover 76 disposed at the recorder unit 11 to the left side direction. At this time, the other end of the torsion spring 75 is compressed by the support protrusion 79 of the cover 76. The elastic ribs 77 and 78 of the cover 76 move within the connection openings 69 and 69a, and (as shown in FIGS. 13B and 14B), are projected into the engaging openings 70 and 70a. Therefore, the connector 23' of the camera unit 12 is connected with the connector 23 of the recorder body 11 in cooperation with the cover 76.

Here, the recorder 11 and the cover 76 of the camera unit 12 always contact the pressure protrusion 80 of the camera unit 12 in cooperation with the torsion spring 75. When separating the camera unit 12 from the recorder unit 11, since the cover 76 substantially covers the connector 23 of the recorder unit 11, short-circuiting of the connector can be prevented.

As described above, the camcorder having a separable camera unit and recorder unit provides a double locking system so as to achieve more stable locking and unlocking of the system. Therefore, it is possible to effectively prevent possible erroneous operation by the user. In addition, a more accurate connection between the electrical connectors can be achieved, and easier engagement and separation between the recorder unit and the camera unit is possible. Moreover, it is possible to prevent short and system pollution by providing a cover substantially covering the connector. In addition, since it is possible to separate or engage the system with only one hand, image recording is made easier.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. A camcorder:
   a recorder unit;
   a camera unit constructed and arranged to be selectively engageable with said recorder unit;
   a locking mechanism for selectively locking together said recorder unit and said camera unit when said recorder unit and said camera unit are engaged, said locking mechanism comprising:
      first locking means for locking together said recorder and camera units during a process of engaging said recorder and camera units, said first locking means comprising:
         a locking groove provided on said recorder unit and having a slanted surface;
         an elongate guide section provided on said camera unit;
         a first locking member having a first end thereof inserted into said guide section so as to be movably mounted therein and a second end thereof constructed and arranged to be inserted into said locking groove; and
         an elastic member mounted at one end of said guide section for providing an elastic bias force whereby said first locking member is biased against said slanted surface of said locking groove;
      second locking means for locking together said camera and recorder units after being engaged.

2. The camcorder of claim 1, wherein said second locking means comprises:
   a rotation lever mounted on said camera unit;
   a rotatably mounted cam operably connected to said rotation lever; and
   a second, pivotably mounted locking member constructed and arranged to pivot in accordance with an action of said cam, said second locking member including a pressure protrusion arranged to project into locking engagement with a portion of said recording unit according to said pivoting of said second locking member.

3. The camcorder of claim 2, wherein said rotation lever is operably associated with a pressure plate constructed and arranged to disengage said first locking member from said locking groove.

4. The camcorder as in claim 1, further comprising signal receiving and transmitting means for receiving and transmitting signals between said recorder and camera units when said recorder and camera units are engaged.

5. The camcorder as in claim 1, further comprising a cable for electrically connecting said recorder unit and said camera unit.

6. The camcorder of claim 4, wherein said signal receiving and transmitting means includes a movable cover constructed and arranged to selectively expose said signal receiving and transmitting means.

7. The camcorder of claim 4, wherein said cover is elastically biased toward a position in which said signal receiving and transmitting means is covered.

8. A camcorder comprising:

a camera unit and a recorder unit selectively engageable with one another; and a locking mechanism for locking together said camera and recorder units when said camera and recording units are engaged, comprising:

a first locking portion constructed and arranged to lock together said camera and recorder units during a process of engaging said camera and recorder units to one another; and a second, manually actuated locking portion constructed and arranged to manually lock together said camera and recording units, after said camera and recorder units are engaged to one another, said second locking portion being mounted in one of said camera unit and said recorder unit, and comprising:

an externally mounted slide lever;

a rack gear fixed to said slide lever;

a rotatably mounted gear engaged with said rack gear;

a cam mounted on said rotatably mounted gear so as to rotate with said rotatably mounted gear; and at least one pivotably mounted lever member constructed and arranged to be pivoted in accordance with a rotation of said cam, said at least one lever member having a pressure protrusion along an edge thereof;

wherein the other of said camera unit and said recorder unit includes a lip, said pivoting of said at least one lever member causing said pressure protrusion to project into a locking engagement with said lip.

9. A camcorder comprising:

a camera unit and a recorder unit selectively engageable with one another; and a locking mechanism for locking together said camera and recorder units when said camera and said camera and recording units are engaged, comprising:

a first locking portion constructed and arranged to lock together said camera and recorder units during a process of engaging said camera and recorder units to one another; and a second, manually actuated locking portion constructed and arranged to manually lock together said camera and recording units, after said camera and recorder units are engaged to one another;

wherein said first locking portion comprises:

a locking member provided on one of said camera unit and said recorder unit; and a locking groove provided on the other of said camera unit and said recorder unit, said locking groove including a first location at which said locking member is insertable into said locking groove, and a second location at which said locking member is locked into said locking groove;

wherein said locking member is movably mounted in an elongate guide hole, whereby said locking member is movable between first and second positions within said guide hole, said locking member being elastically biased towards said first position; and wherein said locking groove includes an inclined portion between said first and second locations of said locking groove, said inclined portion being constructed and arranged to guide said locking member from said first location to said second location while forcing said locking member to move within said guide hole against the direction in which said locking member is elastically biased, whereby, at said second location, said locking member is elastically biased so as to be locked in said locking groove at said second location.

10. The camcorder of claim 9, wherein said second locking portion is mounted in one of said camera unit and said recorder unit, and comprises:

an externally mounted slide lever;

a rack gear mounted to said slide lever;

a rotatably mounted gear engaged with said rack gear;

a cam mounted on said rotatably mounted gear so as to rotate with said rotatably mounted gear; and at least one pivotably mounted lever member constructed and arranged to pivot in accordance with a rotation of said cam, said at least one lever member having a pressure protrusion along an edge thereof;

wherein the other of said camera unit and said recorder unit includes a lip, said pivoting of said at least one lever member causing said pressure protrusion to project into engagement with said lip.

11. The camcorder as in claim 10, wherein said rotatably mounted gear includes a pressure plate projecting therefrom, said pressure plate being aligned with said second location of said locking groove, such that rotation of said rotatably mounted gear when unlocking said camera unit and said recorder unit from each other causes said pressure plate to force said locking member out of said second location of said locking groove so that said locking member is guided towards said first location of said locking groove, whereby said locking member is disengageable from said locking groove.

12. The camcorder according to claim 8, further comprising an electrical connector for electrically connecting said camera and recorder units.

13. The camcorder as in claim 12, wherein said electrical connector comprises first and second connector portions provided on said camera unit and said recorder unit, respectively, said first and second connector portions engaging one another in conjunction with engaging said camera and recorder units with one another.

14. The camcorder as in claim 13, comprising a slidably movable cover covering one of said first and second connector portions and being displaceable during a process of engaging of engaging said recorder and camera units so as to expose said one of said first and second connector portions, whereby said first and second connector portions can be engaged.

15. The camcorder as in claim 14, wherein said cover is elastically biased toward a position where said cover covers said one of said first and second connector portions.

* * * * *